United States Patent [19]
Flocken et al.

[11] Patent Number: 5,408,651
[45] Date of Patent: Apr. 18, 1995

[54] STORE "UNDO" FOR CACHE STORE ERROR RECOVERY

[75] Inventors: Bruce E. Flocken; Russell W. Guenthner; Clinton B. Eckard, all of Glendale; Sleiman Chamoun, Tempe; Jeffrey D. Weintraub, Scottsdale, all of Ariz.

[73] Assignee: Bull HN Information Systems Inc., Billerica, Mass.

[21] Appl. No.: 127,206

[22] Filed: Sep. 27, 1993

[51] Int. Cl.⁶ ............................................. G06F 11/16
[52] U.S. Cl. .................................. 395/575; 364/285.3; 371/91
[58] Field of Search ................. 395/575, 200, 425; 364/133, 228.3, 228.6, 230.4, 269.1, 785.3; 371/9.1, 11.3

[56] References Cited

U.S. PATENT DOCUMENTS 5,339,408 8/1994 Bruckert et al. ................... 395/575

*Primary Examiner*—Vincent P. Canney
*Attorney, Agent, or Firm*—J. S. Solakian; J. H. Phillips

[57] ABSTRACT

In order to efficiently recover from a processing error in a central processing trait (CPU) incorporating a cache memory and a basic processing unit, the BPU is provided in duplicate, and all BPU data manipulation operations are performed redundantly. After duplicate data has been obtained from the cache memory and manipulated by the duplicate BPUs, the outputs from the duplicate BPUs are placed on respective master (MRB) and slave (SRB) result busses which are coupled to the cache unit where the results are compared for identity. If the results are not identical, a local error signal is issued. In response to the error signal, the corrupted data is stored into cache, but, before the cache is deliberately frozen, the data is restored again using a segment of the original data withdrawn from the cache memory by the BPUs such that, when the cache is frozen in anticipation of remedial action, the data block whose modification took place during the faulting operation will have been restored to its preprocessing condition. As a result, restart, if possible, can commence at the same point in the process rather than at an earlier point.

4 Claims, 4 Drawing Sheets

STORE "UNDO" FOR CACHE STORE ERROR RECOVERY

FIELD OF THE INVENTION

This invention relates to information processing systems and, more particularly, to processor error detection and responses to errors in a mainframe central processing unit (CPU).

BACKGROUND OF THE INVENTION

In the design of mainframe central processing units, it is highly desirable to provide powerful and reliable error detection and handling features, and this requirement has mandated the provision of various circuits, firmware and software to sense and resolve the diverse types of errors which may occur in operation.

Among the possible error conditions encountered in a mainframe CPU are those in which a basic processing unit (BPU) part of the CPU, while performing routine data manipulation such as calculating, simply reaches an incorrect result. It can be shown that employing built-in error detection in the circuitry of a BPU results in both a doubling of the types of chips required and a doubling of the number of chips required as well as the necessity of incorporating precharge circuit techniques. This effect not only significantly extends the design effort required to develop a BPU, but also increases the "real estate" or space occupied by the BPU and its support circuitry and consequently that of the CPU.

In the invention disclosed and claimed in U.S. Pat. No. 5,195,101 by Russell W. Guenthner et al (which is assigned to the same assignee as the present invention), this problem was solved, in a CPU incorporating a BPU which included an address and execution (AX) unit, a decimal numeric (DN) unit and a floating point (FP) unit and also incorporating a cache unit situated logically intermediate the BPU and system memory, by duplicating each of the AX, DN and FP chips (i.e., duplicating the BPU) and performing all BPU data manipulation operations redundantly. The outputs from the duplicate BPUs were placed on respective master (MRB) and slave (SRB) result busses which are coupled to the cache unit, and the results were compared in the cache unit. If the results were not identical in each byte of the result, the individual chip in the cache unit detecting the no-compare condition issued an error signal, and appropriate steps to remedy or otherwise respond to the error signal may be undertaken.

This was a very effective technique, but it did leave the CPU in a condition which was somewhat difficult to restart during error recovery, because the BPU would typically have requested a block of memory from the cache unit, and, because of the manner in which the result was stored (even if an error is sensed), the requested block was corrupted such that restart, if possible, would have to take place at a previous step in the halted program and/or require access to main memory to obtain an uncorrupted copy of the corrupted block (which, as an additional complication, may already have been properly altered-perhaps many times-before the fault took place). Nonetheless, certain important economies of logic circuitry drove the requirement to store the corrupted block in cache. Under these circumstances, those skilled in the art will appreciate that it would be very advantageous for a CPU to have available a copy of the requested data in the form immediately preceding the fault such that an attempted restart can take place at the same step at which the fault occurred.

OBJECTS OF THE INVENTION

It is therefore a broad object of this invention to provide improved error detection and restart capability in a mainframe CPU.

It is a more specific object of this invention to provide such improved error detection and restart capability which operates at high speed to identify errors in data manipulation operations performed in the BPU of a CPU and can attempt a restart at the faulting step.

SUMMARY OF THE INVENTION

Briefly, these and other objects of the invention are achieved, in a mainframe CPU incorporating a cache memory and a BPU which includes an address and execution (AX) unit, a decimal numeric (DN) unit and a floating point (FP) unit and also incorporating a cache unit situated logically intermediate the BPU and system memory, by duplicating each of the AX, DN and FP units (i.e., duplicating the BPU) and performing all BPU data manipulation operations redundantly. After duplicate data has been obtained from the cache memory and manipulated by the duplicate BPUs, the outputs from the duplicate BPUs are placed on respective master (MRB) and slave (SRB) result busses which are coupled to the cache unit where the results are compared for identity. If the results are not identical in each byte of the result, a local error signal is issued. In response to the error signal, the corrupted data is stored into cache, but, before the cache is deliberately frozen, the data is restored again using a segment of the original data withdrawn from the cache memory by the BPUs such that, when the cache is frozen in anticipation of remedial action, the data block whose modification took place during the faulting operation will have been restored to its preprocessing condition. As a result, restart, if possible, can commence at the same point in the process rather than at an earlier point.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
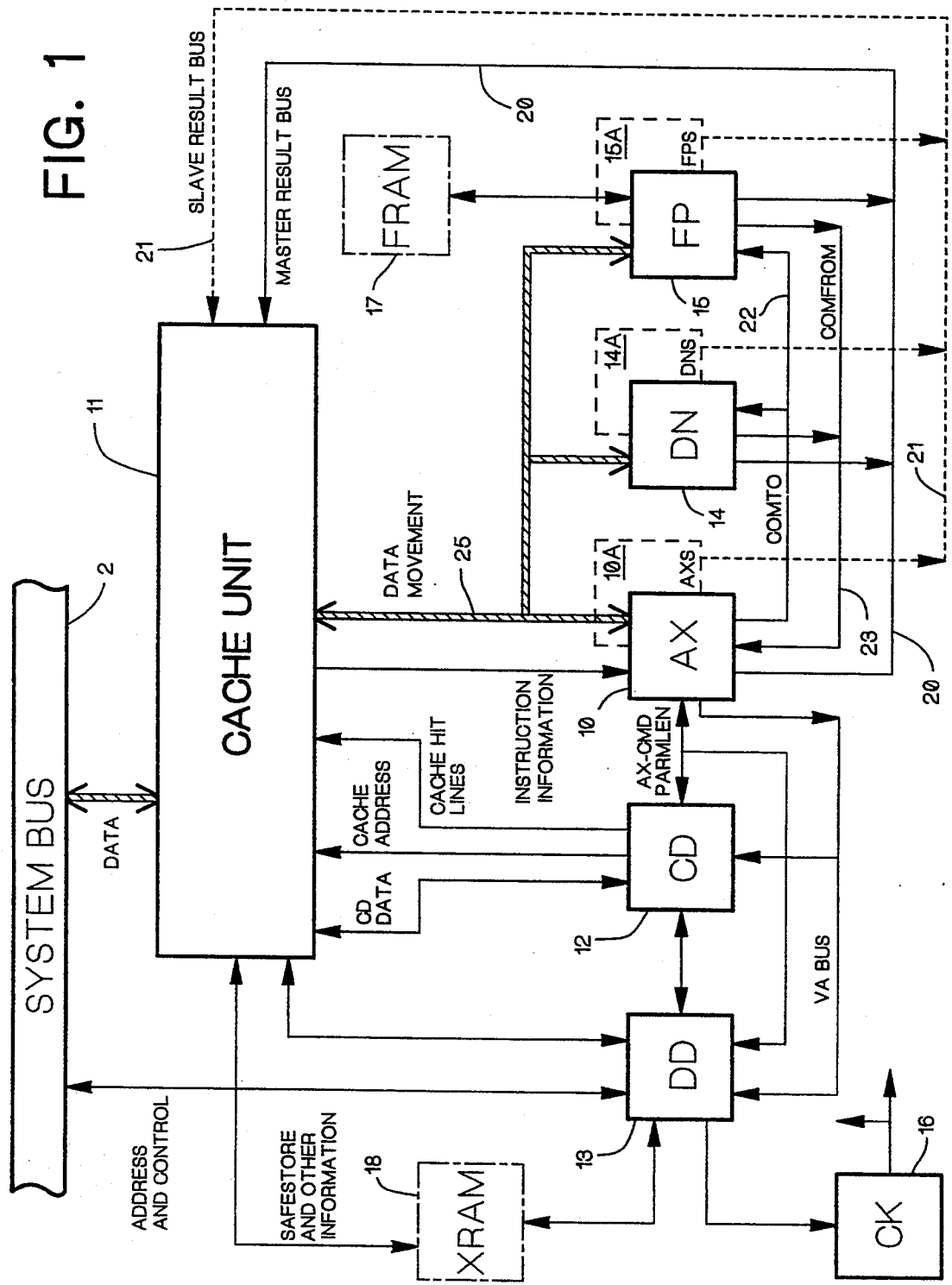
FIG. 1 is a general block diagram of an exemplary central processing unit in which the subject invention is employed.

Reference is first taken to FIG. 1 which is a general block diagram of an exemplary central processing unit.

The Address and Execution Unit (AX unit) is a microprocessing engine which performs all address preparation and executes all instructions except decimal arithmetic, binary floating point and multiply/divide instructions. Two identical AX units 10, 10A perform duplicate actions in parallel, and the resulting AX unit outputs are constantly compared to detect errors. The structure of the AX unit will be described in more detail below. The main functions performed by the AX unit include:
- effective and virtual address formation;
- memory access control;
- security checks;
- register change/use control;
- execution or basic instructions, shift instructions, security instructions, character manipulation and miscellaneous instructions.

The cache section includes a cache unit 11 part of 64K bytes (16K words) and a set associative directory part which defines the main memory location of each 64-byte (16-word) block stored in the cache data part. Physically, the cache section is implemented in an array of ten DT units (the cache unit), a cache directory (CD) 12 and a duplicate directory (DD) 13. Each of the DT, CD and DD units will be described in more detail below.

The specific functions performed by the DT cache unit 11 include:
- combined instruction and operand data storage;
- instruction and operand buffering and alignment;
- data interface with the system bus;
- CLIMB safestore file.

The cache write strategy is "store into". If a longitudinal parity error is detected when reading a portion of a modified block from the cache, the block will to be swapped out of the cache onto the system bus, corrected by circuitry (not shown) intermediate the CPU and main memory (not shown) and written into main memory. The corrected block will then be refetched from main memory.

Two copies of the cache directory information are respectively maintained in the CD and DD blocks which perform different logic functions. The two directory copies allow interrogation of the cache contents from the system bus in parallel and without interference with instruction/operand access from the CPUs and also provide for error recovery. Functions performed by the CD block 12 include:
- cache directory for CPU accesses;
- instruction, operand and store buffer management;
- virtual-to-real address translation paging buffer.

Functions performed by the DD block 13 include:
- cache directory for system accesses;
- system bus control;
- distributed connect/interrupt management;
- cache directory error recovery.

Efficient scientific calculation capability is implemented on the Floating Point (FP) units 15, 15A. The identical FP units execute all binary floating point arithmetic in duplicate. These units, operating in concert with the duplicate AX units 10, 10A, perform scalar or vector scientific processing.

The FP unit 15 (duplicated by the FP unit 15A):
- executes all binary and fixed and floating point multiply and divide operations;
- computes 12 by 72-bit partial products in one machine cycle;
- computes eight quotient bits per divide cycle;
- performs modulo 15 residue integrity checks.

Functions performed by the FP units 15, 15A include:
- executes all floating point mantissa arithmetic except multiply and divide;
- executes all exponent operations in either binary or hexadecimal format;
- preprocesses operands and postprocesses results for multiply and divide instructions;
- provides indicator and status control.

Two special purpose random access memories (FRAM 17 and XRAM 18) are incorporated into the CPU. The FRAM block 17 is an adjunct to the FP units 15, 15A and functions as an FP control store and decimal integer table lookup. The XRAM block 18 is an adjunct to the AX units 10 10A and serves as a scratchpad as well as providing safestore and patch functions.

The CPU also employs a Clock Distribution (CK) block 16 whose functions include:
- clock distribution to the several blocks constituting the CPU;
- shift path control;
- maintenance;
- interface between CMU and CPU;
- provision of clock stop logic for error detection and recovery.

The DN unit 14 (in parallel with the DN unit 14A) performs the execution of the decimal numeric Extended Instruction Set (EIS) instructions. It also executes the Decimal-to-Binary (DTB), Binary-to-Decimal (BTD) conversion EIS instructions and Move-Numeric-Edit (MVNE) EIS instructions in conjunction with the AX unit 10. The DN unit both receives operands from memory and sends results to memory via the cache unit 11.

The AX, DN and FP units, collectively, are sometimes referred to as the Basic Processing Unit (BPU). It was previously noted that the AX, DN and FP units were duplicated with the duplicate units operating in parallel to obtain duplicate results which are available for integrity checking. Thus, master and slave results are obtained in the normal operation of these units. The master results are placed onto a Master Result Bus (MRB) 20 while the slave results are placed onto a Slave Result Bus (SRB) 21. Both the master and slave results are conveyed, on the MRB and SRB respectively, to the cache data array 11 of DT units. The purposes of this arrangement will be described more fully below. In addition, a COMTO bus 22 and a COMFROM bus 23 couple together the AX unit, the DN unit and the FP unit for certain interrelated operations as will also be described more fully below.

Those skilled in the art will understand that a mainframe CPU is subject to the occurrence of numerous errors. While state of the art mainframe CPU's are very reliable and may run for long periods with no errors whatever occurring, there is little tolerance in many applications for accommodating even occasional errors. As a result, it is necessary to provide many error sensing and recovery circuits throughout the logic of a CPU to detect several types of errors such as parity errors (as a common example) which may occur when information is transferred between elements of the CPU. As previously noted, in the specific CPU chosen for illustration and in which the invention finds particular application, the outputs of duplicate master and slave AX, FP and DN units are compared for identical results, and the content of the Master and Slave Result Busses are compared in the Cache Unit for similar identity. Various other errors are sensed throughout the CPU. The CK block receives the error signals and has a primary role in coordinating the error handling processes in the exemplary CPU.

Figure 2:
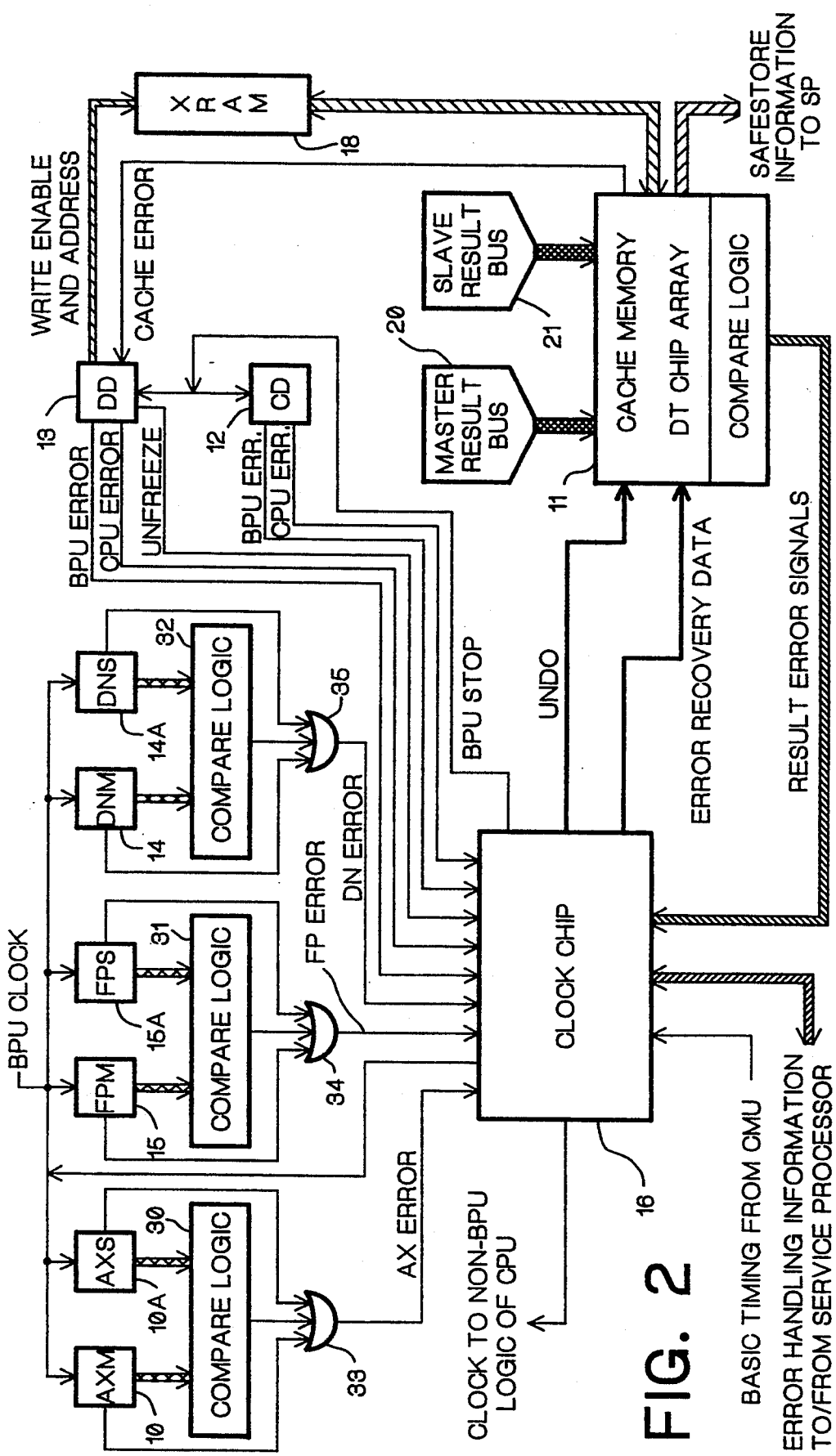
FIG. 2 special purpose block diagram of the central processing unit revealing the error detection and handling aspects of the relationships among the several logic elements.

Attention is now directed to FIG. 2 in which the CPU is shown in a redrawn configuration. It will be seen that numerous errors are reported to the CK block 16. The CPU has a variety of sources of internally detected errors which are classified as hardware retryable, software retryable or non-retryable. Hardware retryable errors are those which are directly compensated by the hardware without involvement or intervention by the software operating system and with little or no involvement by an external service processor (not shown) to which all errors are reported. Certain paging and cache directory errors, for example, are deemed hardware retryable. For other error conditions, which may be software retryable or non-retryable, the CK block 16 will either cause a freeze of BPU or CPU clocks as quickly as possible to minimize any loss of data relating to the failing condition or it will invoke a suspension of BPU and system bus operation. Two types of software retry are employed, one corresponding to a freeze and the other to a suspend. If a clock freeze occurs, the machine state is extracted by the SP and provided to the operating system for retry. If a BPU or CPU suspension occurs, the SP may direct a CPU resume, and the operating system will attempt a software retry.

All errors are reported to the service processor which scans safestore information and other information to make a preliminary determination regarding the ability of the error-detecting CPU (or another CPU) to attempt a retry. Retry conditions are further evaluated by the operating system, and the actual software retry is done by execution on one of the CPUs.

Each of the AX units 10, 10A, FP units 15, 15A and DN units 14, 14A combine multiple error signal lines (as represented by OR-gates 33, 34, 35), including those from the individual unit compare logic blocks 30, 31, 32, to obtain AX, FP and DN ERROR signals which are applied to the CK block 16. The majority of the checked logic areas sense parity errors during data transfers, but other error types, such as directory read mismatch, DIR Level In/Out miscompares, illegal command sequence, increment miscount, multiple directory hit, etc. as well as several types of compares are all monitored. The CD block 12 and DD block 13 each send separate BPU error and CPU error signals to the CK block.

AX errors, FP errors, DN errors and result bus errors are all deemed to be BPU errors. However, the CD block 12 and the DD block 13 can detect and advise the CK block 16 of either BPU errors or CPU errors (for example, cache errors) which are treated differently. In addition, the CD and DD blocks are notified of BPU errors originating elsewhere, and, under certain conditions (such as during a hardware/firmware troubleshooting process), the DD block 13 may order a temporary "unfreeze" of the BPU clock. Certain cache errors are reported directly to the DD block 13 which then determines if a BPU or CPU error signal is to be forwarded to the CK block 16.

It was previously noted that the AX, DN and FP units were duplicated with the duplicate units operating in parallel to obtain duplicate results which are available for integrity checking. Thus, master and slave results are obtained in the normal operation of these units. Both the master and slave results are conveyed, on the MRB and SRB respectively, to the cache data array 11 of DT units. In addition, a COMTO bus 22 and a COMFROM bus 23 couple together the AX unit, the DN unit and the FP unit for certain interrelated operations.

The AX unit 10, DN unit 14 and FP unit 15, communicating with one another via the COMTO bus 22 and COMFROM bus 23 accept data manipulation instructions and operands from the cache unit 11 and deliver the results back to the cache unit via the MRB 20. Redundantly, the secondary AX unit 10A, the secondary DN unit 14A and the secondary FP unit 15A (intercommunicating on their own COMTO and COMFROM busses, not shown in FIG. 1) accept the same data manipulation instructions and operands from the cache unit 11 and deliver the results back to the cache unit via the SRB 21. Thus, the results appearing at a given time on the MRB and SRB should always be identical, and if they are not, a basic processing error will have occurred.

The apparatus and method by which the master and slave results are compared are described in detail in U.S. Pat. No. 5,195,101 entitled Efficient Error Detection in a VLSI Central Processing Unit, issued Mar. 16, 1993, to Russell W. Guenthner et al and assigned to the same assignee as the subject invention. U.S. Pat. No. 5,195,101 is incorporated by reference herein.

Figure 3:
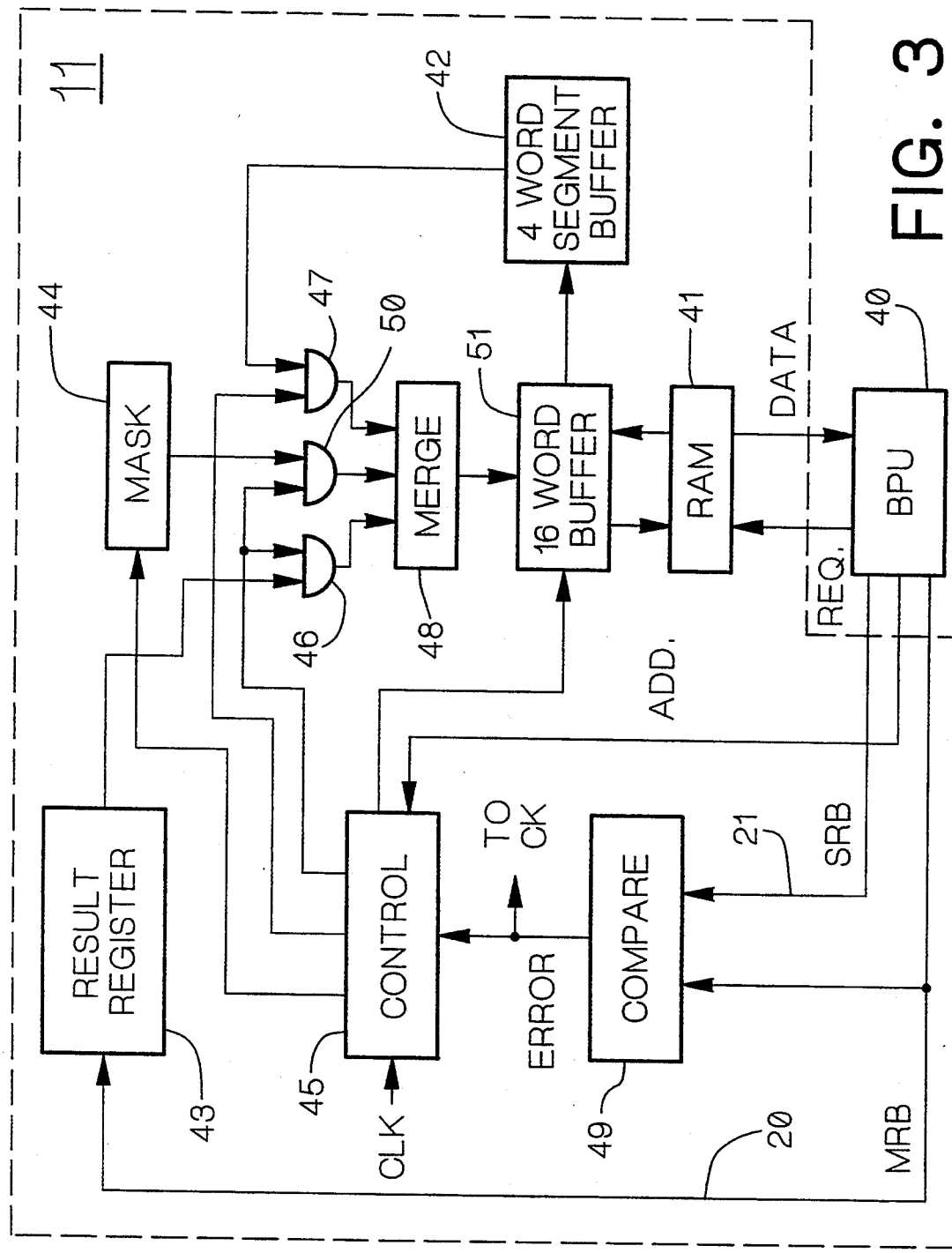
FIG. 3 is a block diagram of the cache unit section of the central processing unit which shows detailed aspects of the present invention and FIG. 4 is a process flow chart illustrating the sequence of operations in an exemplary embodiment of the invention.

Consider now FIG. 3 in which the cache unit 11 is shown in simplified block diagram form. During normal operation, the BPU 40 issues a request to the RAM 41 for a 16 word block of data which includes the specific information it wishes to process. The requested 16 word block is also transferred to a 16 word buffer register 51. As previously described, after the BPU has processed the data, the results are sent to the cache unit 11 via the MRB 20 and SRB 21 where they are compared for identity in the compare block 49. In addition, the results on the MRB 20 are transferred to two word result buffer register 43, and address information from the BPU is sent to the control block 45 to indicate where the original 16 word block, modified by the two word results, is to be stored in the 16 word buffer register 51 (and eventually in the RAM 41) and the position of the two word result in the 16 word block. The two word result (which may be double or single precision) is also transmitted to the result register 43 for temporary storage.

The control block 45, using the address information from the BPU and the CLK signal from the clock block 16 (FIGS. 1 and 2), issues coordinating signals to the mask block 44 and to AND-gate arrays 46, 47, 50 and also to transfer the appropriate four word segment which will receive the modified data into a four word segment buffer register 42, all in preparation for a merging operation. The output of the result register block 43 is applied to the AND-gate array 46, and the output of the four word segment buffer register 42 is applied to the AND-gate array 47. During normal operation, AND-gate arrays 46, 47, 50 are temporarily enabled by the control block signals such that the contents of the result register 43 and the four word segment buffer register 42 are applied to the merge block 48. The signals from the mask block 44 specify the position in the four word segment of the original 16 word block at which the two word result will modify the original data. The modified updated data is then stored back into the 16 word buffer register 51 for eventual transfer to the RAM 41 at the address from which it was originally taken.

As previously noted, the results appearing on the MRB 20 and SRB 21 are routinely examined for identity in the compare block 49. If the results are not identical, an error signal issues, and the CPU is quickly frozen and remedial action undertaken. However, certain important economies of logic circuitry drive the requirement to continue with the immediate store operation in the cache unit, notwithstanding the compare error. As a result, the original 16 word block will be modified and restored back into the 16 word buffer register 51 with unreliable data. This condition has made it more difficult to achieve a restart, because processing must resume, if it is determined that it can continue, at a step prior to the corruption of the data in the 16 word block affected. Under some conditions, a considerable reprocessing of previously executed steps must be undertaken to reach the same point in the process.

This problem is solved, according to the present invention, in the following manner. When the control block 45 receives an error signal from the compare block (it will be understood that this is only one of many error signals which may be generated in the CPU, but it is the one of direct interest here), it sends the error signal to the CK block 16 (FIGS. 1 and 2) to institute a freeze and corrective action. However, it does not freeze the operation of the cache unit immediately after the completion of the store of the corrupted 16 word block into 16 word buffer register 51. Rather, it directs a successive additional store cycle in which only the AND-gate array 47 is enabled such that the original data stored in the four word segment buffer register 42 is transferred to the merge block 48 and to the 16 word buffer register 51 to again rewrite the block, this time in uncorrupted form. Thereafter, the remedial action can be undertaken in such a manner that restart, if possible, can commence at the process point at which the fault occurred to thereby eliminate the necessity to attempt restart at an earlier point in the process.

Figure 4:
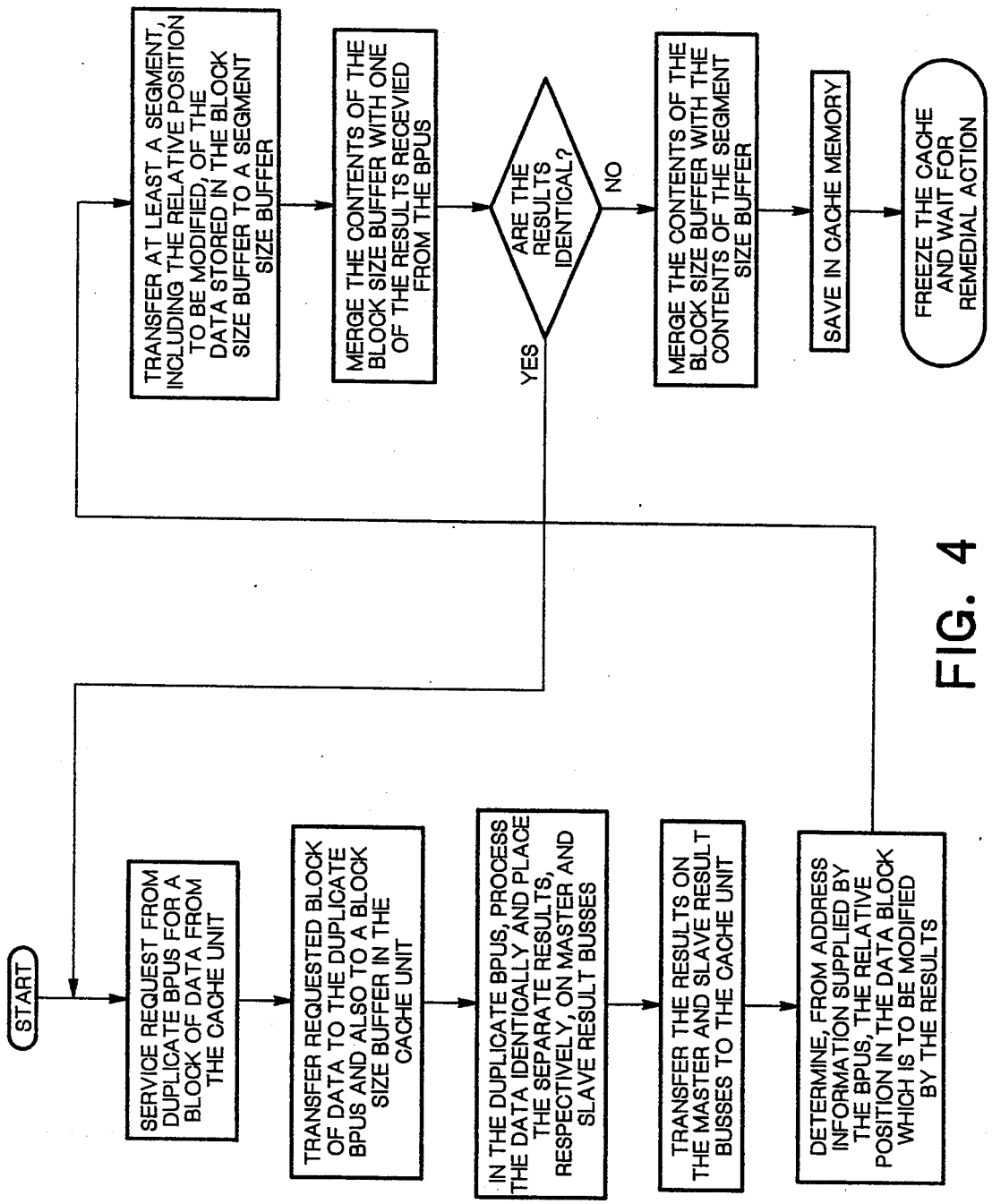

Those skilled in the art will understand that the block diagram shown in FIG. 3 is necessarily simplified in order to best illustrate the invention. In actual practice, a two-phase clock, various multiplexers, and other logic techniques are conventionally used to eliminate logic races and to handle other routine housekeeping tasks, all as well known in the art and susceptible to variation among different specific logic designs. As an aid to the logic designer, the process flow chart of FIG. 4 illustrates the sequence and relationships of the various actions necessary to practice the invention and is an example of the actual implementation of the invention in the presently preferred embodiment.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processing unit comprising:
   A) first basic processing unit means for executing computer instructions and producing a result for each computer instruction executed;
   B) second basic processing unit means for executing computer instructions and producing a result for each computer instruction executed; said first and second basic processing unit means concurrently executing the same computer instruction and producing the result of the execution of the same computer instruction concurrently;
   C) a cache unit, said cache unit including random access memory means for providing data concurrently to said first and second basic processing unit means for processing and for storing one of the two concurrently produced results produced by said basic processing unit means after execution of the same computer instruction by said first and second basic processing unit means using the data obtained from said random access memory;
   D) first result bus means for transmitting the result of the execution of each computer instruction by said first basic processing unit means to said cache unit;
   E) second result bus means for transmitting the result of the execution of each computer instruction by said second basic processing unit means to said cache unit; said first and second result bus means transmitting the results of the execution of the same computer instruction by said first and second basic processing unit means to said cache unit concurrently;
   F) said cache unit further including:
   1) first buffer means for temporarily storing the data provided to said first and second basic processing unit means for processing;
   2) comparing means for comparing the results transmitted to said cache unit by said first and second result bus means and for issuing an error signal if the results do not compare;
   3) second buffer means for temporarily storing the result of the concurrent execution of the same instruction by one of said first and second basic processing unit means transmitted to said cache unit by said first and second result bus means;
   4) merge means for performing a first merge operation to modify the data temporarily stored in said first buffer means by the results temporarily stored in said second buffer means;
   5) third buffer means for temporarily storing at least a segment of the data provided to said first and second basic processing unit means for processing, which segment includes the portion of the data temporarily stored in said first buffer means which is subsequently modified during the first merge operation; and
   6) control means responsive to the issuance of an error signal by said comparing means for directing said merge means to perform a second merge operation to further modify the once-modified contents temporarily stored in said first buffer means by merging the once-modified contents thereof with the contents of said third buffer means, thereby restoring the contents of said first buffer means to the same data last provided to said first and second basic processing unit means.

2. The central processing unit of claim 1 which further includes in said cache unit, masking means under the direction of said control means, which masking means serves to identify to said merge means the position in said first buffer means which is to be modified by the results temporarily stored in said second buffer means during the first merge operation.

3. The central processing unit of claim 1 in which said second buffer means temporarily stores the result of the concurrent execution of the same instruction received by said cache unit on said first result bus means.

4. The central processing unit of claim 2 in which said second buffer means temporarily stores the result of the concurrent execution of the same instruction received by said cache unit on said first result bus means.

* * * * *